United States Patent
Clark

(10) Patent No.: US 10,982,873 B1
(45) Date of Patent: Apr. 20, 2021

(54) INTEGRATED AIR QUALITY CONTROL SYSTEM

(71) Applicant: Alarm.com Incorporated, Tysons, VA (US)

(72) Inventor: Colby Kevin Clark, Provo, UT (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/782,637

(22) Filed: Feb. 5, 2020

Related U.S. Application Data

(60) Provisional application No. 62/802,834, filed on Feb. 8, 2019.

(51) Int. Cl.
*F24F 11/64* (2018.01)
*F24F 130/40* (2018.01)
*F24F 110/60* (2018.01)

(52) U.S. Cl.
CPC .......... *F24F 11/64* (2018.01); *F24F 2110/60* (2018.01); *F24F 2130/40* (2018.01)

(58) Field of Classification Search
CPC ..... F24F 11/64; F24F 2130/40; F24F 2110/60
See application file for complete search history.

(56) References Cited

U.S. PATENT DOCUMENTS

| | | | |
|---|---|---|---|
| 9,280,884 B1 | 3/2016 | Schultz et al. | |
| 2007/0199952 A1* | 8/2007 | Carpenter | B05B 12/122 222/52 |
| 2015/0156031 A1 | 6/2015 | Fadell et al. | |
| 2015/0306533 A1* | 10/2015 | Matlin | F24F 11/30 96/420 |
| 2016/0291615 A1* | 10/2016 | Zakaria | G05D 23/1934 |
| 2017/0211838 A1* | 7/2017 | Child | G08B 25/08 |
| 2018/0154297 A1* | 6/2018 | Maletich | B01D 46/442 |

* cited by examiner

*Primary Examiner* — Fan S Tsang
*Assistant Examiner* — David Siegel
(74) *Attorney, Agent, or Firm* — Fish & Richardson P.C.

(57) ABSTRACT

Methods, systems, and apparatus, including computer programs encoded on a computer storage medium, for monitoring air quality with multiple sensing devices. The methods, systems, and apparatus include actions of: obtaining first sensor data from a sensor that is not an air quality sensor, determining that the first sensor data satisfy a first air quality criterion, in response to determining that the first sensor data satisfy the first air quality criterion, obtaining second sensor data from an air quality sensor, determining that the second sensor data satisfy a second air quality criterion, and based on a determination that the second sensor data satisfy the second air quality criterion, activating an air quality device.

19 Claims, 6 Drawing Sheets

INTEGRATED AIR QUALITY CONTROL SYSTEM

CROSS REFERENCE TO RELATED APPLICATIONS

This application claims benefit of U.S. Provisional Application No. 62/802,834, filed on Feb. 8, 2019, and titled "INTEGRATED AIR QUALITY CONTROL SYSTEM," which is incorporated by reference in its entirety.

TECHNICAL FIELD

This application relates to property monitoring technology, and more particularly, to an integrated air quality control system including one or more sensing devices.

BACKGROUND

Many people equip homes and businesses with monitoring systems to provide increased security for their homes and businesses. The monitoring systems include several electronic components including sensors that may detect several different activities or environmental conditions within a monitored property. People may desire to reduce unpleasant smell from areas of the monitored property such as bathrooms, kitchens, closets, garages, and a basement. In some cases, people may use a scent dispenser to cover the unpleasant smell in the monitored property.

SUMMARY

Techniques are described for monitoring technology. For example, an air quality control system may obtain input from one or more sensing devices and control an air quality control device that may be a fan, an air purifier, or a dispenser, among other things. The air quality control system may be configured to determine air quality based on sensor data from the one or more sensing devices that detect various environmental parameters. The air quality control system may determine whether to turn on the air quality control device based on the air quality.

According to one aspect of the subject matter described in this application, a computer-implemented method includes obtaining first sensor data from a sensor that is not an air quality sensor, determining that the first sensor data satisfy a first air quality criterion, in response to determining that the first sensor data satisfy the first air quality criterion, obtaining second sensor data from an air quality sensor, determining that the second sensor data satisfy a second air quality criterion, and based on a determination that the second sensor data satisfy the second air quality criterion, activating an air quality device.

Implementations according to this aspect may include one or more of the following features. For examples, the method of claim 1, may further include obtaining third sensor data from the air quality sensor after the second sensor data are obtained, determining that the third sensor data does not satisfy the second air quality criterion, and based on a determination that the third sensor data do not satisfy the second air quality criterion, turning off the air quality device. In some examples, obtaining the first sensor data may include obtaining sound data from a sound sensor that is configured to detect a sound in an area of a property.

In some implementations, the sound data may represent at least one of a flushing sound from a toilet, a urinating sound from the toilet, a sound from a door of the property, a sound from a car in the property, or a sound from a garage of the property, and the second sensor data may include air quality data including at least one of an airborne particle count in air in the area of the property or relative levels of chemical components in the air in the area of the property. In some examples, determining that the first sensor data satisfy the first air quality criterion may include determining the sound data matches the flushing sound or the urinating sound.

In some implementations, determining that the first sensor data satisfy the first air quality criterion may include determining a decibel level corresponding to the sound data, comparing the decibel level to a threshold level that is preset to correspond to a potential degradation of air quality in the area of the property, and based on the decibel level being greater than the threshold level, determining that the sound satisfy the first air quality criterion. In some examples, obtaining second sensor data from the air quality sensor may include, in response to determining that the decibel level is greater than the threshold level, detecting at least one of an airborne particle count in air in the area of the property or relative levels of chemical components in the air in the area of the property.

In some implementations, activating the air quality device may include, based on both (i) the determination that the decibel level is greater than the threshold level and (ii) a detection that at least one of the airborne particle count or one of the relative levels of chemical components exceeds a reference level, operating a ventilation fan that is configured to circulate air in the area of the property or a dispenser that is configured to discharge an air freshening sub stance.

In some implementations, obtaining the first sensor data may include obtaining an image or a video of an area of a property from a camera that is configured to monitor the area of the property. In some examples, determining that the first sensor data satisfy the first air quality criterion may include detecting, in the image or the video of the area of the property, a car that enters or leaves a garage of the property, and obtaining the second sensor data from the air quality sensor may include, in response to a detection of the car that enters or leaves the garage of the property, detecting at least one of an airborne particle count in air in the area of the property or relative levels of chemical components in the air in the area of the property.

In some implementations, activating the air quality device may include, based on both (i) the detection of the car that enters or leaves the garage of the property and (ii) a determination that at least one of the airborne particle count or one of the relative levels of chemical components exceeds a reference level, operating a ventilation fan that is configured to circulate air in the area of the property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

BRIEF DESCRIPTION OF DRAWINGS

Like reference numbers and designations in the various drawings indicate like elements.

DETAILED DESCRIPTION

Environmental control devices may operate based on a measurement of one specific type of parameter. For example, a heating, ventilation, and air conditioning (HVAC) system may adjust an indoor temperature based on a measured temperature at one or more areas of a property. In another, an air purifier may circulate air through a filter based on a detection of an airborne particle count in an indoor area. In some cases, the environmental control devices may operate based on a set time interval. For instance, a scent dispenser may spray an air freshening liquid to an area every hour regardless of an odor level of the area.

Disclosed is an air quality control system that operates based on various types of parameters. Air quality may be determined based on many factors or environmental parameters such as temperature, humidity, airborne particles, and odor. In some implementations, the air quality control system may utilize various types of parameters such as the environmental parameters, a sound, an image, or vibration to determine whether to operate an air quality control device. The air quality control system may obtain the various types of parameters in a sequence, simultaneously, or based on a predetermined condition.

In some examples, the air quality control system may be located at various areas of the property such as bathrooms, kitchens, utility closets, garages, sheds, pet houses, or laundry rooms, among other things. In some implementations, the air quality control system may be integrated with a monitoring system that includes various sensors configured to monitor various areas of a property.

In some implementations, the air quality control system may conserve energy by reducing unnecessary operation of the air quality control device based on input from various sensors. For example, the air quality control system may control, based on a determination that an air quality level in a room is within a threshold level based on sensor data from two or more sensors, a ventilation system not to discharge climate-controlled air from the room. In another, the air quality control system may also reduce mold growth due to high humidity based on operation according to a humidity level and a temperature in an area of a property. In some examples, the air quality control system may determine air quality based on sensor data from a first type of sensor, and then determine whether to obtain additional sensor data from a second type of sensor that may be the same as or different from the first type of sensor.

Figure 1:
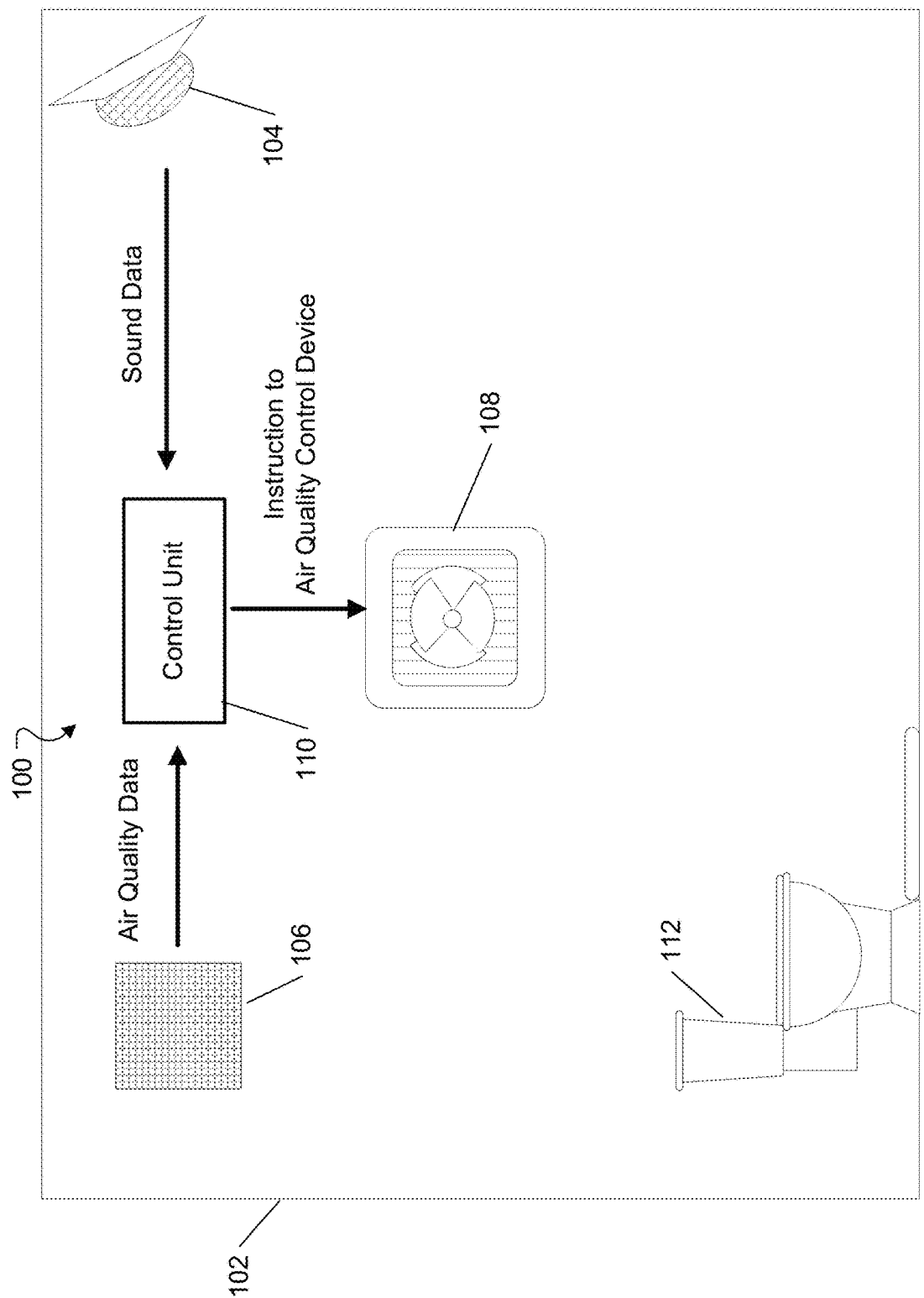
FIG. 1 illustrates an example of an air quality control system at a monitored property.

FIG. 1 illustrates an example of an air quality control system at a monitored property. As shown in FIG. 1, an air quality control system 100 monitors an area of a property such as a bathroom 102 to control air quality in the bathroom 102. The air quality control system 100 includes a plurality of sensors such as a sound sensor 104 (e.g., microphone) that detects a sound, and an air quality sensor 106 that detects odor, airborne particles, or a chemical composition of air. The air quality control system 100 further includes an air quality control device 108 that vents or circulates air in the bathroom 102. The air quality control system 100 further includes a control unit 110 that obtains sensor data from the sound sensor 104 and the air quality sensor 106 and that controls operation of the air quality control device 108 based on the sensor data.

In some implementations, the air quality control device 108 may include one or more of the sound sensor 104, the air quality sensor 106, and the control unit 110 in a single unit. For instance, the air quality control device 108 may include the control unit 110 and the air quality sensor 106, while the sound sensor 104 is separately located at a different location from the air quality control device 108. In another example, the air quality control device 108 may include the air quality sensor 106, while the control unit 110 and the sound sensor 104 are components of a separate monitoring system such as a surveillance system of the property. In some cases, the control unit 110 may be an onboard processor of the air quality control device 108. In other implementations, the sound sensor 104, the air quality sensor 106, the air quality control device 108, and the control unit 110 are individual devices installed at different locations of the property.

The sound sensor 104 is configured to detect a sound and provide sound data to the control unit 110. For example, the sound sensor 104 may detect a toilet flushing sound or a urinating sound from the toilet 112, which may indicate a use of the toilet 112. The sound may be associated with a potential degradation of air quality (e.g., odor) in the bathroom 102. For example, use of a toilet will likely degrade air quality. In another example, the sound sensor 104 may detect a sound of a user approaching or entering the bathroom 102, and provide the sound data to the control unit 110. In some implementations, the air quality control system 100 may include a plurality of sound sensors that detect sounds from various areas of the property and that are connected to the control unit 110. For instance, the sound sensors may include an interactive smart speaker (e.g., Bluetooth speaker/microphone) that can receive a voice command from a user and that enables communication between the user and the control unit 110.

The air quality sensor 106 is configured to detect air quality and provide air quality data to the control unit 110. For example, the air quality sensor 106 may be a contaminant sensor configured to detect a chemical composition of air in the bathroom 102. In some examples, the air quality sensor 106 may detect relative levels of chemical components (e.g., relative volumes of chemical elements with respect to a unit volume) such as hydrogen, carbon dioxide, methane, and hydrogen sulfide in the air. The relative levels may change when a user uses the toilet 112. Alternatively or in addition, the air quality sensor 106 may detect an airborne particle count (e.g., a number of particles in a cubic centimeter) that may increase when a user uses the bathroom 102. In this case, the airborne particle count may represent the air quality. In some cases, the air quality sensor 106 is configured to detect toxic gases (e.g., gas leak from a utility closet, carbon monoxide) in the monitored property.

In some implementations, the air quality sensor 106 may transmit all the detected chemical levels to the control unit 110, for example, 60% nitrogen, 20% hydrogen, 10% carbon dioxide, 5% methane, and 5% oxygen. In some examples, the air quality sensor 106 may detect one or more specific elements such as methane and hydrogen sulfide, and transmit the detected chemical levels of the specific elements to the control unit 110. In some cases, the air quality sensor 106 may detect whether the chemical levels of the specific elements are within a threshold level. The air quality sensor 106 may transmit a flag variable to the control unit 110. For example, the air quality sensor 106 may transmit zero (0) to indicate that the chemical levels are less than the threshold level, and one (1) to indicate that the chemical levels are greater than or equal to the threshold level. In other cases, the control unit 110 may obtain the detected levels of the chemical elements from the air quality sensor 106, and determine whether the levels of the chemical elements are within the threshold level or range, which will be described in detail below.

The air quality control device 108 may include one or more fans configured to circulate air in the bathroom 102, an air inlet configured to receive air from the bathroom 102 based on operation of the fan, a filter that blocks or absorbs contaminants from air that passes through the filter, an air outlet configured to discharge the filtered air to the bathroom 102, and a vent configured to discharge air from the bathroom 102 to an outside. In some cases, the air quality control device 108 may include an air blower configured to supply fresh air to the bathroom 102, a dehumidifier configured to absorb water vapor from the bathroom 102, or a scent dispenser configured to discharge an air freshening substance (e.g., aroma chemicals, essential oils). For instance, the air quality control device 108 may discharge the air freshening substance after ventilating odor from the bathroom 102 based on operation of the fan.

The air quality control device 108 may also include a cooling component (e.g., heat sink, water circulation system) configured to dissipate heat from one or more components (e.g., a fan) of the air quality control device 108. In some implementations, the air quality control device 108 may be connected to or include components of another ventilation system (e.g., heating, ventilation, and air conditioning (HVAC) system) of the property. For instance, one or more fans or a vent of the air quality control device 108 may transmit cooled or heated air from the HVAC system of the property.

The air quality control device 108 may operate based on instructions from the control unit 110. For example, the fan of the air quality control device 108 may be activated in response to a turn-on instruction from the control unit 110, and deactivated in response to a turn-off instruction from the control unit 110. In some examples, the air quality control device 108 may adjust one or more operation parameters based on instructions from the control unit 110.

For example, the air quality control device 108 may adjust at least one of a rotational speed, a rotational direction, an operation period, or an operation frequency of the fan based on the instructions from the control unit 110 according to the determined air quality. For instance, the air quality control device 108 may increase the rotational speed of the fan based on an instruction from the control unit 110 according to a low air quality level (e.g., certain chemical elements in air outside a threshold range). The air quality control device 108 may decrease the rotational speed of the fan or turn off the fan based on an instruction from the control unit 110 according to a normal air quality level (e.g., chemical elements within a threshold range). In some implementations, the air quality control device 108 may operate based on an operation frequency. For example, the fan may rotate at a first speed/direction for a first time period and rotate at a second speed/direction for a second period or stop rotation for the second period. In some examples, changing rotational direction could be used to more effectively push/pull air in the room based on desired outcome (e.g., pushing air outside via an exhaust vent, or pulling air in from outside via an exhaust vent, not blowing air "on" an individual in the bathroom and instead pulling air away from the user).

In some examples, the air quality control device 108 may be controlled to discharge air from an area of the property or introduce air to the area. For example, the control unit 110 may determine a rotational direction of the fan that can satisfy an air quality criterion with a shorter operation time of the fan. For instance, the control unit 110 may determine (i) a first operation time that is required for the fan to recover air quality of the bathroom 102 by rotating the fan in a first direction, and (ii) a second operation time that is required for the fan to recover the air quality of the bathroom 102 by rotating the fan in a second direction. The air quality control device 108 may be configured to, based on a determination that the first operation time is less than the second operation time, suction and discharge stale air from the bathroom 102 by rotating the fan in the first direction for the first operation time.

The control unit 110 is configured to obtain sensor data from one or more sensors and provide instructions to the air quality control device 108 to control operation of the air quality control device 108 based on the sensor data. For example, the control unit 110 may obtain sound data from the sound sensor 104, and air quality data from the air quality sensor 106. The control unit 110 then analyzes the obtained sensor data, and provides instructions to the air quality control device 108 to turn on, turn off, and control the air quality control device 108. In some examples, the control unit 110 provides instructions to the air quality control device 108 to adjust one or more operation parameters of the air quality control device 108. The control unit 110 may be connected to the sound sensor 104, the air quality sensor 106, and the air quality control device 108 through a wired or wireless network, which will be described in detail with FIG. 3.

In some implementations, the control unit 110 may obtain the sensor data based on one or more air quality criteria. For example, the control unit 110 may be configured to activate a subsequent sensor (e.g., air quality sensor 106) based on a determination that air quality corresponding to sensor data from a prior sensor (e.g., sound sensor 104) satisfies an air quality criterion. For example, the control unit 110 is configured to obtain the sound data from the sound sensor 104, and then obtain the air quality data from the air quality sensor 106 if the air quality corresponding to the sound data satisfies the air quality criterion.

In some implementations, the control unit 110 may obtain sensor data from all available sensors, at a time or in a sequence. For example, the control unit 110 may obtain the sensor data from both of the sound sensor 104 and the air quality sensor 106 simultaneously or one at a time. In some cases, the control unit 110 may determine an overall air quality score based on the sensor data from the available sensors. For example, the overall air quality score may include at least one of an average, a median, a maximum, a minimum, a range, a quartile, or other representations of respective air quality levels of the sensor data from the available sensors.

In some implementations, the control unit 110 may include or communicate with a user device configured to control operation of the air quality control device 108. For instance, a user may utilize a handheld device to remotely activate and deactivate the air quality control device 108. In some cases, the user may also increase and decrease a fan speed of the air quality control device 108 to increase and decrease an amount of air volume (e.g., cubic feet per minute) ventilated by the fan. In some examples, the control unit 110 may transmit an alert notification (e.g., text message, phone call) to a user or an emergency system based on a detection of toxic gases in the property. In some cases, the control unit 110 may turn on the air quality control device 108 based on a detection of toxic gases in the property regardless of other sensor data (e.g., sound data, video data).

The control unit 110 determines air quality based on the obtained sensor data. For example, the control unit 110 may compare the determined air quality to a reference air quality. Based on a determination that the air quality satisfies an air quality criterion, the control unit 110 may provide a turn-on instruction to the air quality control device 108. For example, the control unit 110 may determine that air quality is less than the reference air quality and, in response, the control unit 110 may provide a turn-on instruction to the air quality control device 108.

In some implementations, the air quality control system 100 may include or be connected to other sensing devices such as an image sensor (e.g., camera), a motion sensor, a proximity sensor, a pressure sensor, a vibration sensor, a humidity sensor, or a temperature sensor. For example, the control unit 110 may activate the air quality control device 108 based on a motion sensor detecting motion of a user or users in an area of the property. In the example shown in FIG. 1, one or both of the sound sensor 104 and the air quality sensor 106 may be replaced with other sensing devices. For instance, the sound sensor 104 may be replaced with a camera (see FIG. 2). In some cases, the air quality control system 100 may include the camera in addition to the sound sensor 104 and the air quality sensor 106.

In some examples, the air quality control system 100 may include a humidity sensor and a temperatures sensor in addition to the sound sensor 104. In these examples, the control unit 110 may activate the air quality control device 108 to dehumidify the bathroom 102 based on a detection of a shower sound from the sound sensor 104 and an increase of a humidity level or a temperature in the bathroom 102 during or after the shower in the bathroom 102.

In some cases, the control unit 110 may select one or more sensors among various sensors based on a detection condition such as an amount of light, noise, a time of day, power consumption level (e.g., battery level) of the various sensors. For example, the control unit 110 may select a motion sensor rather than a camera at a low light condition (e.g., at night). In another, the control unit 110 may select a camera rather than a sound sensor at a noisy condition (e.g., at a party). In some cases, the control unit 110 may select a sound sensor rather than a camera if the camera has a low battery level.

One or more components of the air quality control system 100 may be powered by a battery, or an electrical outlet, or a solar power source. For example, the control unit 110 and the air quality control device 108 may be connected to an electrical outlet, while the sound sensor 104 and the air quality sensor 106 may be powered by rechargeable batteries. In some cases, the air quality control system 100 may be implemented as a standalone unit connect to an electrical outlet.

Figure 2:
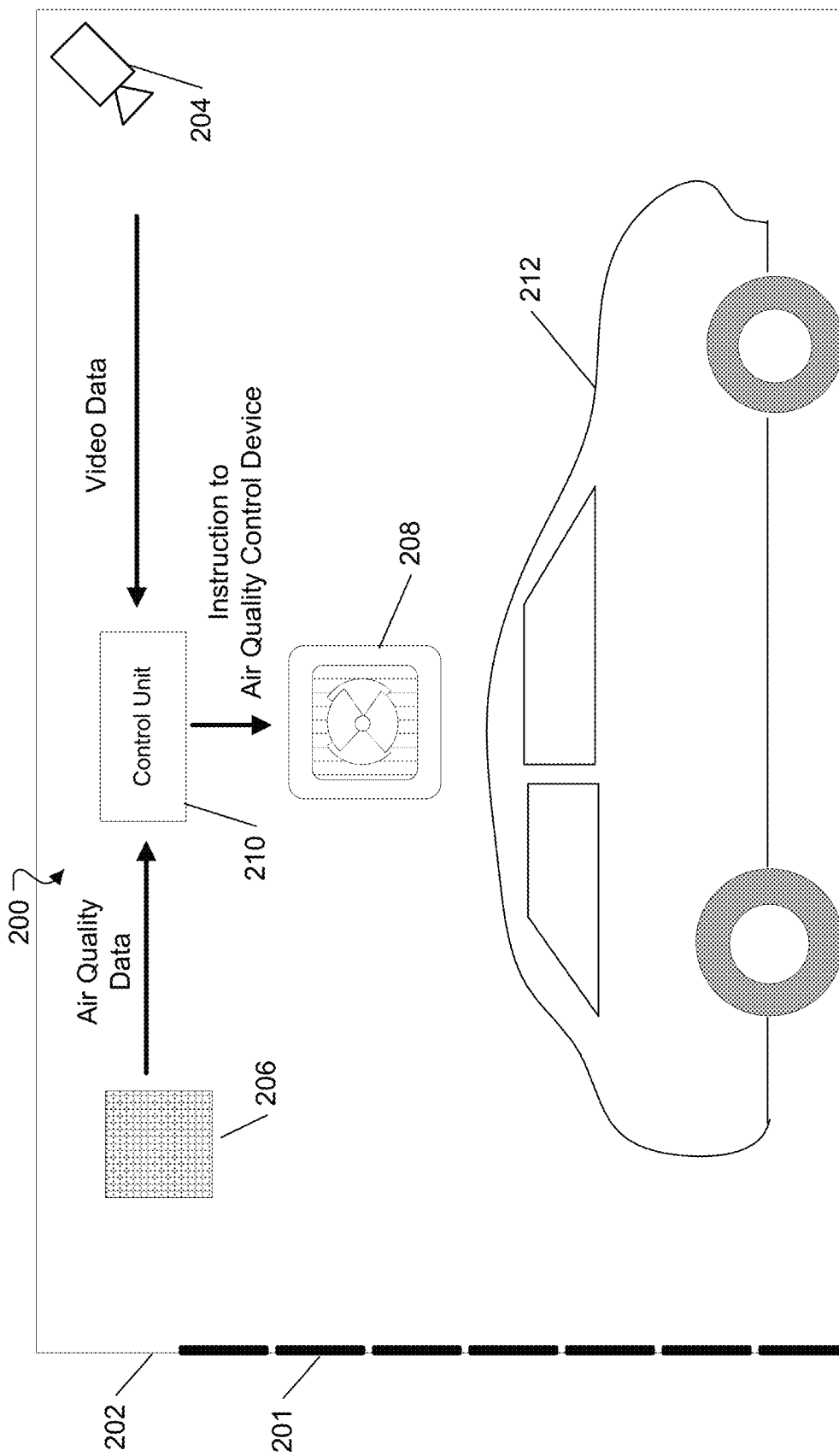
FIG. 2 illustrates another example of an air quality control system at a monitored property.

FIG. 2 illustrates another example of an air quality control system at a monitored property. As shown in FIG. 2, an air quality control system 200 monitors an area of a property such as a garage 202 to control air quality in the garage 202 or an area (e.g., a family room) connected to the garage 202. The air quality control system 200 includes a plurality of sensors such as a camera 204 that captures an image(s) and video, and an air quality sensor 206 that detects odor, airborne particles, or a chemical composition of air. The air quality control system 200 further includes an air quality control device 208 that vents or circulates air in the garage 202. The air quality control system 200 further includes a control unit 210 that obtains sensor data from the camera 204 and the air quality sensor 206 and that determines operation of the air quality control device 208 based on the sensor data.

In some implementations, one or more components of the air quality control system 200 may correspond to the one or more components of the air quality control system 100 described above with respect to FIG. 1. For example, the air quality sensor 206, air quality control device 208, and control unit 210 in FIG. 2 may correspond to the air quality sensor 106, air quality control device 108, and control unit 110 in FIG. 1, respectively. The following description may omit some of common features of those components described above.

In some implementations, the air quality control device 208 may include one or more of the camera 204, the air quality sensor 206, and the control unit 210 in a single unit. For instance, the air quality control device 208 may include the control unit 210 and the air quality sensor 206, while the camera 204 is separately located at a different location from the air quality control device 208. In another example, the air quality control device 208 may include the air quality sensor 206, while the control unit 210 and the camera 204 are components of a separate monitoring system such as a surveillance system of the property. In other implementations, the camera 204, the air quality sensor 206, the air quality control device 208, and the control unit 210 are individual devices installed at different locations at the property.

In some implementations, the camera 204 may be installed in the garage 202 and capture an image or video of a car 212. In some examples, the camera 204 may constantly monitor the garage 202 to detect existence and movement of the car 212. In some examples, the camera 204 may be activated based on another sensor data or instruction by the control unit 210. For instance, the property may include a sensor (e.g., an infra-red sensor, a motion sensor, a vibration sensor) configured to detect opening and closing of a garage door 201 or motion in the garage 202. The camera 204 may be configured to switch, based on a detection of opening of the garage door 201, from a power saving mode to an active mode to capture a video of an area of the garage 202. In some examples, the camera 204 is configured to rotate, pan, and tilt to capture an image of a specific area of the car 212 (e.g., the license plate, the vehicle identification number) to enable the control unit 210 to identify the car 212.

The camera 204 is configured to capture movement of the car 212 and provide video data to the control unit 210. For example, the camera 204 captures a video of the car 212 moving inward or outward of the garage 202, which may indicate exhaust gas from the car 212. The camera 204 may provide the video data to the control unit 210 to inform a potential degradation of air quality (e.g., contamination of air) in the garage 202. In another example, the camera 204 captures a video of a user approaching or entering the garage 202, and provides the video data to the control unit 210 to inform a potential degradation of air quality in the garage 202 due to departure of the car 212.

The control unit 210 is configured to obtain sensor data from one or more sensors and provide instructions to the air quality control device 208 to control operation of the air quality control device 208 based on the sensor data. For example, the control unit 210 may obtain video data from the camera 204, and air quality data from the air quality sensor 206. The control unit 210 analyzes at least one of the obtained video data or the air quality data, and provides instructions to the air quality control device 208 to turn on, turn off, and control the air quality control device 208. For example, the control unit 210 provides instructions to the air quality control device 208 to adjust one or more operation parameters of the air quality control device 208. The control unit 210 may be connected to the camera 204, the air quality sensor 206, and the air quality control device 208 through a wired or wireless network.

In some implementations, the control unit 210 may obtain the sensor data based on one or more air quality criteria. For example, the control unit 210 may be configured to activate a subsequent sensor (e.g., air quality sensor 206) based on a determination that air quality corresponding to sensor data from a prior sensor (e.g., camera 204) satisfies an air quality criterion. In some examples, the control unit 210 may be configured to obtain the video data from the camera 204, and then obtain the air quality data from the air quality sensor 206 if the air quality corresponding to the video data satisfies the air quality criterion. For instance, the air quality criterion for the video data may be whether the video data include an inward or outward movement of the car 212, which may cause a degradation of air quality in the garage 202. In some examples, the control unit 210 may instruct the air quality sensor 206 to transmit the air quality data if the video data include the inward or outward movement of the car 212.

In some implementations, the control unit 210 may obtain sensor data from multiple sensors and determine air quality based on air quality criteria. For example, the control unit 210 may obtain the sensor data from both of the camera 204 and the air quality sensor 206 simultaneously or one at a time. The control unit 110 may determine whether the air in the garage 202 based on the sensor data from both of the camera 204 and the air quality sensor 206. For example, the control unit 210 may instruct the air quality control device 208 to turn on if the video data include the inward or outward movement of the car 212 and the air quality data is outside of a threshold level. The control unit 210 may instruct the air quality control device 208 to turn on if the video data do not include the inward or outward movement of the car 212 and the air quality data is outside of the threshold level. The control unit 210 may instruct the air quality control device 208 not to turn on or turn off if the video data include the inward or outward movement of the car 212 but the air quality data is within the threshold level.

In some implementations, the control unit 210 may identify a type of the car 212 based on image or video data from the camera 204, and determine whether to obtain the air quality data from the air quality sensor 205 or whether to operate the air quality control device 208. For example, the control unit 210 may identify, based on an image of the car 212, the car 212 as a low emission vehicle (e.g., electric car, hybrid car) that discharges no or less exhaust gas than combustion engine cars. In some cases, the control unit 210 may not provide, based on a determination that the car 212 corresponds to the low emission vehicle, an instruction to the air quality sensor 206 to transmit the air quality data. In some cases, the control unit 210 may provide an instruction to the air quality control device 208 to reduce an operation speed, an operation period, or an operation period of the air quality control device 208 based on a determination that the car 212 corresponds to the low emission vehicle.

In some cases where the air quality control system 200 includes a sound sensor, the air quality control device 208 may operate based on sounds of the car (e.g., engine starting sound, engine stopping sound, wheel rolling sound).

Figure 3:
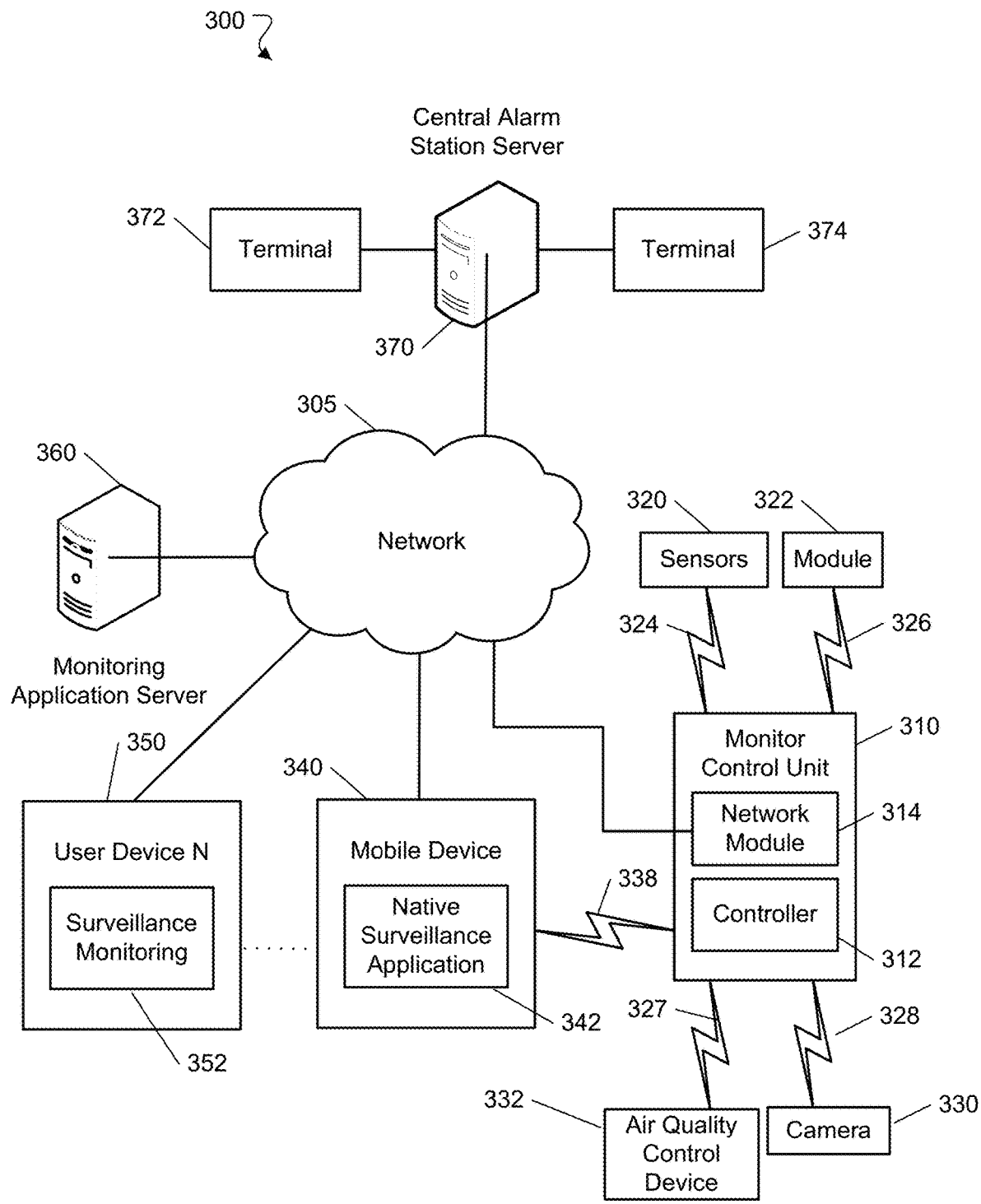
FIG. 3 illustrates an example of a monitoring system integrated with an air quality control device.

FIG. 3 illustrates an example of a monitoring system integrated with an air quality control device. As shown in FIG. 3, a system 300 may be configured to provide surveillance, reporting, and air quality control for a monitored property. The system 300 includes a network 305, a monitoring system control unit 310, one or more user devices 340, 350, a monitoring application server 360, a central alarm station server 370, and an air quality control device 332. In some examples, the network 305 facilitates communications between the monitoring system control unit 310, the one or more user devices 340, 350, the monitoring application server 360, and the central alarm station server 370.

The network 305 is configured to enable exchange of electronic communications between devices connected to the network 305. For example, the network 305 may be configured to enable exchange of electronic communications between the monitoring system control unit 310, the one or more user devices 340, 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The monitoring system control unit 310 includes a controller 312 and a network module 314. The controller 312 is configured to control a monitoring system (e.g., a home alarm or security system) that includes the monitoring system control unit 310. In some examples, the controller 312 may include a processor or other control circuitry configured to execute instructions of a program that controls operation of an alarm system. In these examples, the controller 312 may be configured to receive input from sensors, detectors, or other devices included in the alarm system and control operations of devices included in the alarm system or other household devices (e.g., a thermostat, an appliance, lights, etc.). For example, the controller 312 may be configured to control operation of the network module 314 included in the monitoring system control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the monitoring system control unit 310 to communicate over a local area network and/or the Internet. The network module 314 also may be a voiceband modem configured to enable the alarm panel to communicate over the telephone lines of Plain Old Telephone Systems (POTS).

The monitoring system that includes the monitoring system control unit 310 includes one or more sensors or detectors. For example, the monitoring system may include multiple sensors 320. The sensors 320 may include a contact sensor, a motion sensor, a glass break sensor, or any other type of sensor included in an alarm system or security system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The monitoring system control unit 310 communicates with the module 322 and the camera 330 to perform surveillance or monitoring. The module 322 is connected to one or more lighting systems and is configured to control operation of the one or more lighting systems. The module 322 may control the one or more lighting systems based on commands received from the monitoring system control unit 310. For instance, the module 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building monitored by the monitoring system control unit 310. The camera 330 may be configured to capture single, static images of the area and also video images of the area in which multiple images of the area are captured at a relatively high frequency (e.g., thirty images per second). The camera 330 may be controlled based on commands received from the monitoring system control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the monitoring system control unit 310. The camera 330 may employ a small solar cell to recharge the battery when light is available. Alternatively, the camera 330 may be powered by the controller's 312 power supply if the camera 330 is co-located with the controller 312.

The sensors 320, the module 322, the air quality control device 332, and the camera 330 communicate with the controller 312 over communication links 324, 326, 327, and 328. The communication links 324, 326, 327, and 328 may be a wired or wireless data pathway configured to transmit signals from the sensors 320, the module 322, the air quality control device 332, and the camera 330 to the controller 312. The sensors 320, the module 322, the air quality control device 332, and the camera 330 may continuously transmit sensed values to the controller 312, periodically transmit sensed values to the controller 312, or transmit sensed values to the controller 312 in response to a change in a sensed value.

The communication link 327 over which the air quality control device 332 and the controller 312 communicate may include a local network. The air quality control device 332 and the controller 312 may exchange air quality information and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The communication link 328 over which the camera 330 and the controller 312 communicate may include a local network. The camera 330 and the controller 312 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 360 is an electronic device configured to provide monitoring services by exchanging electronic communications with the monitoring system control unit 310, the one or more user devices 340, 350, and the central alarm station server 370 over the network 305. For example, the monitoring application server 360 may be configured to monitor events (e.g., alarm events) generated by the monitoring system control unit 310. In this example, the monitoring application server 360 may exchange electronic communications with the network module 314 included in the monitoring system control unit 310 to receive information regarding events (e.g., alarm events) detected by the monitoring system control unit 310. The monitoring application server 360 also may receive information regarding events (e.g., alarm events) from the one or more user devices 340, 350.

In some examples, the monitoring application server 360 may route alarm data received from the network module 314 or the one or more user devices 340, 350 to the central alarm station server 370. For example, the monitoring application server 360 may transmit the alarm data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the monitoring system control unit 310 or the one or more user devices 340, 350.

The central alarm station server 370 is an electronic device configured to provide alarm monitoring service by exchanging communications with the monitoring system control unit 310, the one or more user devices 340, 350, and the monitoring application server 360 over the network 305. For example, the central alarm station server 370 may be configured to monitor alarm events generated by the monitoring system control unit 310. In this example, the central alarm station server 370 may exchange communications with the network module 314 included in the monitoring system control unit 310 to receive information regarding alarm events detected by the monitoring system control unit 310. The central alarm station server 370 also may receive information regarding alarm events from the one or more user devices 340, 350.

The central alarm station server 370 is connected to multiple terminals 372 and 374. The terminals 372 and 374 may be used by operators to process alarm events. For example, the central alarm station server 370 may route alarm data to the terminals 372 and 374 to enable an operator to process the alarm data. The terminals 372 and 374 may include general-purpose computers (e.g., desktop personal computers, workstations, or laptop computers) that are configured to receive alarm data from a server in the central alarm station server 370 and render a display of information based on the alarm data. For instance, the controller 312 may control the network module 314 to transmit, to the central alarm station server 370, alarm data indicating that a sensor 320 detected a door opening when the monitoring system was armed. The central alarm station server 370 may receive the alarm data and route the alarm data to the terminal 372 for processing by an operator associated with the terminal 372. The terminal 372 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more user devices 340, 350 are devices that host and display user interfaces. For instance, the user device 340 is a mobile device that hosts one or more native applications (e.g., the native surveillance application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a native surveillance application 342. The native surveillance application 342 refers to a software/firmware program running on the corresponding mobile device that enables the user interface and features described throughout. The user device 340 may load or install the native surveillance application 342 based on data received over a network or data received from local media. The native surveillance application 342 runs on mobile devices platforms, such as iPhone, iPod touch, Blackberry, Google Android, Windows Mobile, etc. The native surveillance application 342 enables the user device 340 to receive and process image and sensor data from the monitoring system. In some implementations, the native surveillance application 342 may display air quality levels of various rooms of the property and operation states of the air quality control device 332 of the various rooms.

The user device 350 may be a general-purpose computer (e.g., a desktop personal computer, a workstation, or a laptop computer) that is configured to communicate with the monitoring application server 360 and/or the monitoring system control unit 310 over the network 305. The user device 350 may be configured to display a surveillance monitoring user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340, 350 communicate with and receive monitoring system data from the monitoring system control unit 310 using the communication link 338. For instance, the one or more user devices 340, 350 may communicate with the monitoring system control unit 310 using various local wireless protocols such as WiFi, Bluetooth, Z-wave, Zigbee, HomePlug (Ethernet over powerline), or wired protocols such as Ethernet and USB, to connect the one or more user devices 340, 350 to local security and automation equipment. The one or more user devices 340, 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340, 350 are shown as communicating with the monitoring system control unit 310, the one or more user devices 340, 350 may communicate directly with the sensors and other devices controlled by the monitoring system control unit 310. In some implementations, the one or more user devices 340, 350 replace the monitoring system control unit 310 and perform the functions of the monitoring system control unit 310 for local monitoring and long range/offsite communication.

In other implementations, the one or more user devices 340, 350 receive monitoring system data captured by the monitoring system control unit 310 through the network 305. The one or more user devices 340, 350 may receive the data from the monitoring system control unit 310 through the network 305 or the monitoring application server 360 may relay data received from the monitoring system control unit 310 to the one or more user devices 340, 350 through the network 305. In this regard, the monitoring application server 360 may facilitate communication between the one or more user devices 340, 350 and the monitoring system.

In some implementations, the one or more user devices 340, 350 may be configured to switch whether the one or more user devices 340, 350 communicate with the monitoring system control unit 310 directly (e.g., through communication link 338) or through the monitoring application server 360 (e.g., through network 305) based on a location of the one or more user devices 340, 350. For instance, when the one or more user devices 340, 350 are located close to the monitoring system control unit 310 and in range to communicate directly with the monitoring system control unit 310, the one or more user devices 340, 350 use direct communication. When the one or more user devices 340, 350 are located far from the monitoring system control unit 310 and not in range to communicate directly with the monitoring system control unit 310, the one or more user devices 340, 350 use communication through the monitoring application server 360.

Although the one or more user devices 340, 350 are shown as being connected to the network 305, in some implementations, the one or more user devices 340, 350 are not connected to the network 305. In these implementations, the one or more user devices 340, 350 communicate directly with one or more of the monitoring system components and no network (e.g., Internet) connection or reliance on remote servers is needed.

In some implementations, the one or more user devices 340, 350 are used in conjunction with only local sensors and/or local devices in a house. In these implementations, the system 300 only includes the one or more user devices 340, 350, the sensors 320, the module 322, the air quality control device 332, and the camera 330. The one or more user devices 340, 350 receive data directly from the sensors 320, the module 322, the air quality control device 332, and the camera 330 and sends data directly to the sensors 320, the module 322, the air quality control device 332, and the camera 330. The one or more user devices 340, 350 provide the appropriate interfaces/processing to provide visual surveillance and reporting.

In other implementations, the system 300 further includes network 305 and the sensors 320, the module 322, the air quality control device 332, and the camera 330 are configured to communicate sensor and image data to the one or more user devices 340, 350 over network 305 (e.g., the Internet, cellular network, etc.). In yet another implementation, the sensors 320, the module 322, the air quality control device 332, and the camera 330 (or a component, such as a bridge/router) are intelligent enough to change the communication pathway from a direct local pathway when the one or more user devices 340, 350 are in close physical proximity to the sensors 320, the module 322, the air quality control device 332, and the camera 330 to a pathway over network 305 when the one or more user devices 340, 350 are farther from the sensors 320, the module 322, the air quality control device 332, and the camera 330.

In some examples, the system leverages GPS information from the one or more user devices 340, 350 to determine whether the one or more user devices 340, 350 are close enough to the sensors 320, the module 322, the air quality control device 332, and the camera 330 to use the direct local pathway or whether the one or more user devices 340, 350 are far enough from the sensors 320, the module 322, the air quality control device 332, and the camera 330 that the pathway over network 305 is required. In other examples, the system leverages status communications (e.g., pinging) between the one or more user devices 340, 350 and the sensors 320, the module 322, the air quality control device 332, and the camera 330 to determine whether communication using the direct local pathway is possible. If communication using the direct local pathway is possible, the one or more user devices 340, 350 communicate with the sensors 320, the module 322, the air quality control device 332, and the camera 330 using the direct local pathway. If communication using the direct local pathway is not possible, the one or more user devices 340, 350 communicate with the sensors 320, the module 322, the air quality control device 332, and the camera 330 using the pathway over network 305.

In some implementations, the system 300 provides end users with access to images captured by the camera 330 to aid in decision making. The system 300 may transmit the images captured by the camera 330 over a wireless WAN network to the user devices 340, 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door opening event for a door that leads to an area within a field of view of the camera 330, or motion in the area within the field of view of the camera 330. In other implementations, the camera 330 may capture images continuously, but the captured images may be stored or transmitted over a network when needed.

In some implementations, one or more of the components of the system 300 (e.g., the monitoring application server 360) may be configured to monitor air quality in indoor areas of the property and control the air quality using an air quality control device 332 based on sensor data from at least on of sensors 320 or cameras 330. For instance, the system 300 may control the air quality control device 332 of the property based on determining that a garage area shows an incoming car and the air quality data from the sensors 320 is outside of threshold level. In another, the system 300 may control the air quality control device 332 based on detecting movement or sound in a room and determining that the air quality data of the room is outside of threshold level.

In some implementations, all of the processing described throughout this disclosure may be implemented in a monitoring system control panel located inside the property being monitored, as opposed to sending data to an external server for processing. For example, rather than being a separate server located in a remote location, the monitoring application server 360 may be a logical component inside of the monitoring system control unit 310. In this example, the monitoring system control unit 310 performs the processing of air quality without having to send sensor data to a separate server separated by a network. In other implementations, all of the processing described throughout this disclosure may be performed on a standalone device (e.g., air quality control device 332).

In other implementations, all of the processing described throughout this disclosure may be performed on a remote server (e.g., monitoring application server 360). In these implementations, the monitoring system control panel (or sensors themselves) may send sensor data, air quality data, and image/video data to the remote server over a network and the remote server may perform all of air quality control based on analysis of one or more of sensor data, air quality data, and image/video data. For instance, the monitoring system control unit 310 sends all sensor data, air quality data, and captured image/video data to the monitoring application server 360, and the monitoring application server 360 performs the processing of air quality control based on analysis of one or more of the sensor data, air quality data, and image/video data.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 3, the processing described throughout this disclosure may be mixed between the monitoring system control unit 310 and the monitoring application server 360.

Figure 4:
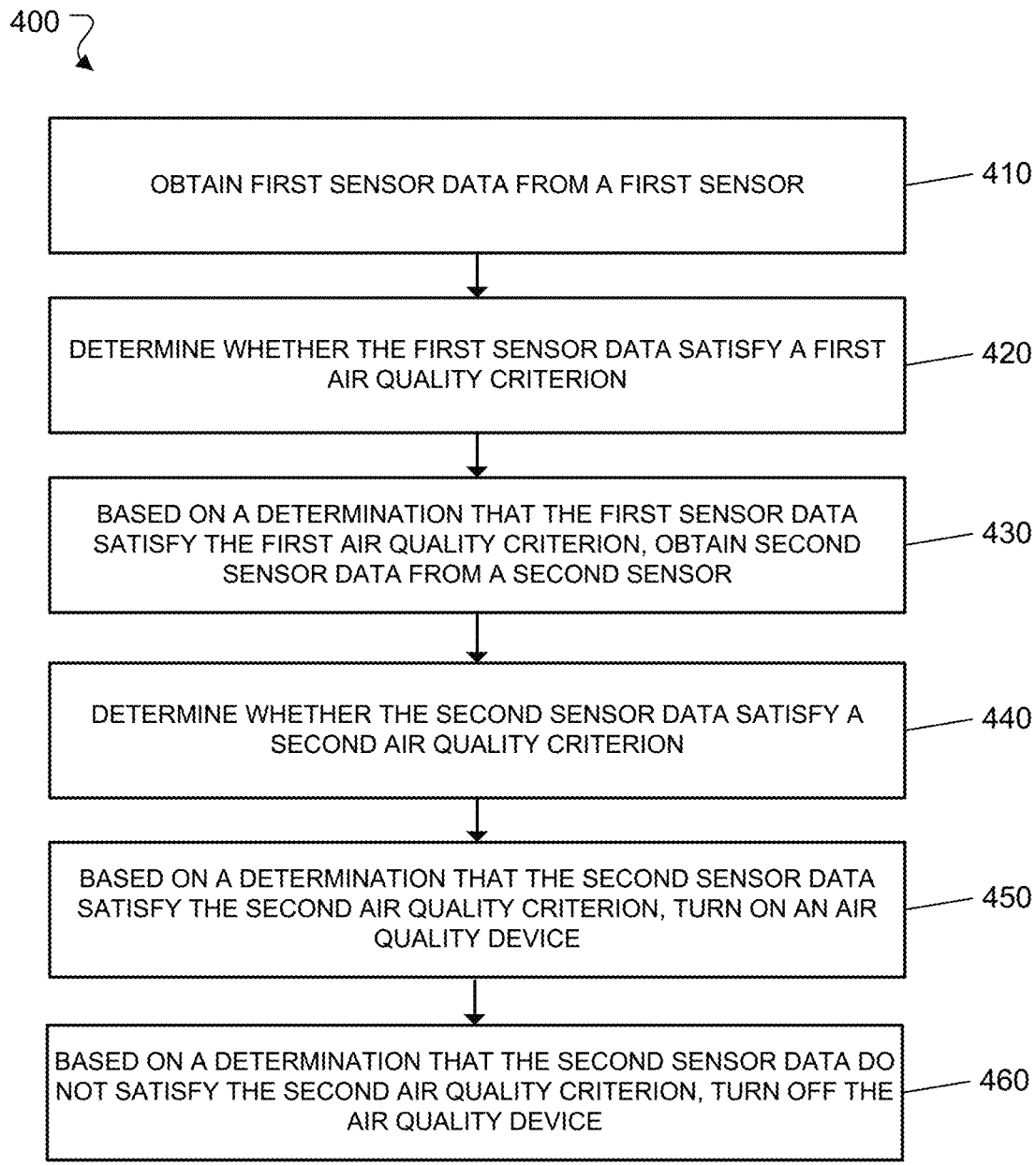
FIG. 4 is a flow diagram of an example process.

FIG. 4 is a flow diagram of an example process 400. The process 400 is described with examples of being performed with system 100. However, the process 400 may be performed with other systems.

The process 400 includes obtaining first sensor data from a first sensor (410). For example, the control unit 110 may obtain sound data (e.g., toilet flushing sound) from the sound sensor 104. The first sensor may be not an air quality sensor. A sensor that is not an air quality sensor may be a sensor that does not detect particles in air. For example, in some implementations, a sensor that measures sound is not an air quality sensor and a sensor that is a camera that captures video is not an air quality sensor.

In some implementations, the air quality control system 100 may be installed at a kitchen area, and the sound sensor 104 may obtain cooking sound such as the sound of a pot boiling. In some implementations, the control unit 110 may obtain the sound data from the sound sensor 104 over a network. In some cases, the first sensor may be an onboard sensor of the control unit 110. In such cases, the first sensor data may be internally transferred to one or more processors of the control unit 110 through a printed circuit board (PCB). In some examples, the first sensor may correspond to other types of sensors such as an image sensor (e.g., a camera 204 in FIG. 2). Various types of sensors may be onboard sensors of the control unit 110, or separately installed at the monitored property. The control unit 110 may obtain the first sensor data from one or more of the various types of sensors over a network.

The process 400 includes determining whether the first sensor data satisfy a first air quality criterion (420). For example, the control unit 110 determines whether the first sensor data correspond to a potential air quality degradation in the monitored area. In some examples, the control unit 110 may determine air quality corresponding to the first sensor data, and compare the determined air quality to a reference air quality. The air quality may be determined according to types of sensor data. For example, the control unit 110 may directly use the decibel level of the sound data as a representation of air quality. For instance, the control unit 110 may determine that the first sensor data satisfy the first air quality criterion if the decibel level of the sound data is greater than 50 dB.

In some implementations, determining that the first sensor data satisfy a first air quality criterion may include determining that the sound data match an actual sound of an event. For instance, the control unit 110 may determine the sound data are actually of a toilet flushing. The sound data may represent at least one of a flushing sound from a toilet, a urinating sound from the toilet, a sound from a door of the property, a sound from a car in the property (e.g., engine vibration), or a sound from a garage of the property, etc. In some examples, the control unit 110 may utilize a reference sound that is set to determine a matching event corresponding to the sound data.

In some examples, the control unit 110 may include a learned artificial neural network that has been trained to classify the sound data into corresponding events, and determine a matching event based on an output from the learned artificial neural network. In some examples, the learned artificial neural network may have been trained to classify sample images into corresponding events. In such examples, the control unit 110 may input images of an area of the property to the artificial neural network and determine the matching event based on an output from the artificial neural network.

The process 400 includes obtaining, based on a determination that the first sensor data satisfy the first air quality criterion, a second sensor data from a second sensor (430). For examples, the process 400 may include, in response to determining that the first sensor data satisfy the first air quality criterion, obtaining a second sensor data from an air quality sensor. In some examples, the control unit 110 may provide an instruction to the air quality sensor 106 to transmit air quality data if the first sensor data satisfy the first air quality criterion as described above at 420. In some cases, the control unit 110 may fetch the air quality data that are available at the air quality sensor 106. Alternatively or in addition, the control unit 110 may store air quality data measured by the air quality sensor 106 in a memory device, and load the stored air quality data for processing based on a determination that the first sensor data satisfy the first air quality criterion.

The process 400 includes determining whether the second sensor data satisfy a second air quality criterion (440). In some cases, the control unit 110 may compare the air quality data (e.g., chemical composition) from the air quality sensor 106 to a reference composition. In this case, the chemical composition may represent air quality of the monitored area. For example, the control unit 110 may determine that the second sensor data satisfy the second air quality criterion if the air quality data include a methane level over a threshold level (e.g., 3%).

In some examples, the control unit 110 may be trained with various "smell" samples that correspond to various chemical compositions. For example, the control unit 110 may obtain a chemical composition corresponding to baking smell, and store the chemical composition of baking smell in a memory device in an exclusion rule. The exclusion rule may include one or more chemical compositions that have been determined to be pleasant to a user by training or provided by other data source (e.g., a database including chemical compositions of fruit smell).

The exclusion rule may include other types of sensor data. For instance, the exclusion rule may include a decibel range corresponding to the sound of human talking or singing. The control unit 110 may determine that the second sensor data do not satisfy the second air quality criterion if the sensor data correspond to one or more chemical compositions (e.g., baking smell) included in the exclusion rule. Similarly, the control unit 110 may determine that the second sensor data do not satisfy the second air quality criterion if the sensor data correspond to the sound of human talking or singing that are included in the exclusion rule.

In some implementations, the control unit 110 may include an odor list that includes one or more chemical compositions that have been determined to be unpleasant to a user by training or provided by other data source (e.g., a database including chemical compositions of body waste smell). The control unit 110 may determine that the second sensor data satisfy the second air quality criterion if the sensor data correspond to one or more chemical compositions included in the odor list.

The process 400 includes turning on an air quality control device based on a determination that the second sensor data satisfy the second air quality criterion (450). For example, the control unit 110 may provide, based on a determination that the air quality data from the air quality sensor 106 is outside of a threshold level, an instruction to the air quality control device 108 over a network to rotate a fan of the air quality control device 108. In some examples, the control unit 110 may provide instructions to adjust one or more operation parameters of the air quality control device 108 based on the air quality data relative to the threshold level. For instance, the control unit 110 may provide an instruction to rotate the fan of the air quality control device 108 with a 50% rotation speed of a maximum speed based on a determination that the air quality data correspond to a moderate contamination level (e.g., less than 50% of the threshold level). In another, the control unit 110 may provide an instruction to increase or decrease an operation period of the air quality control device 108 based on a change of the relative level of the air quality data with respect to the threshold level.

In some implementations, where the air quality control device 108 is configured to be always on and to run according to one or more operation modes, the control unit 110 may activate the air quality control device 108 to run an operation mode among the one or more operations modes based on a determination that the second sensor data satisfy the second air quality criterion. In some examples, the one or more operation modes may be preset by a manufacturer of the air quality control device 108. In some examples, the one or more operation modes may be preset by a user of the air quality control device 108. For example, the air quality control device 108 may include a scent dispenser that is always on, and the control unit 110 may activate the scent dispenser to dispense a specific kind of scent or a specific amount of scent fluid. In another, the air quality control device 108 may include a HVAC system, and the control unit 110 may activate one or more components (e.g., a fan, a heater, a heat pump, an air conditioner) of the HVAC system.

The process 400 further includes turning off the air quality control device 108 based on a determination that the second sensor data do not satisfy the second air quality criterion (460). For example, if the air quality data from the air quality sensor 106 come into a range within the threshold level after operation of the air quality control device 108, the control unit 110 may provide an instruction to the air quality control device 108 to stop rotating the fan of the air quality control device 108. In that way, the air quality control device 108 may reduce an unnecessary operation time when the air quality data come into the range within the threshold level.

In some implementations, where the air quality control device 108 is configured to be always on and has one or more operation modes, the control unit 110 may deactivate the air quality control device 108 to stop an operation among the one or more operations modes based on a determination that the second sensor data do not satisfy the second air quality criterion. For example, the control unit 110 may deactivate the scent dispenser to stop dispensing scent. In another, the control unit 110 may deactivate one or more components of the HVAC system.

In some implementations, the control unit 110 may control or change an operation or setting of the HVAC system. For example, the control unit 110 may reduce a target humidity level based on detecting a usage of the bathroom 102 based on both of the sound data (e.g., showering sound) and the air quality data.

Figure 5:
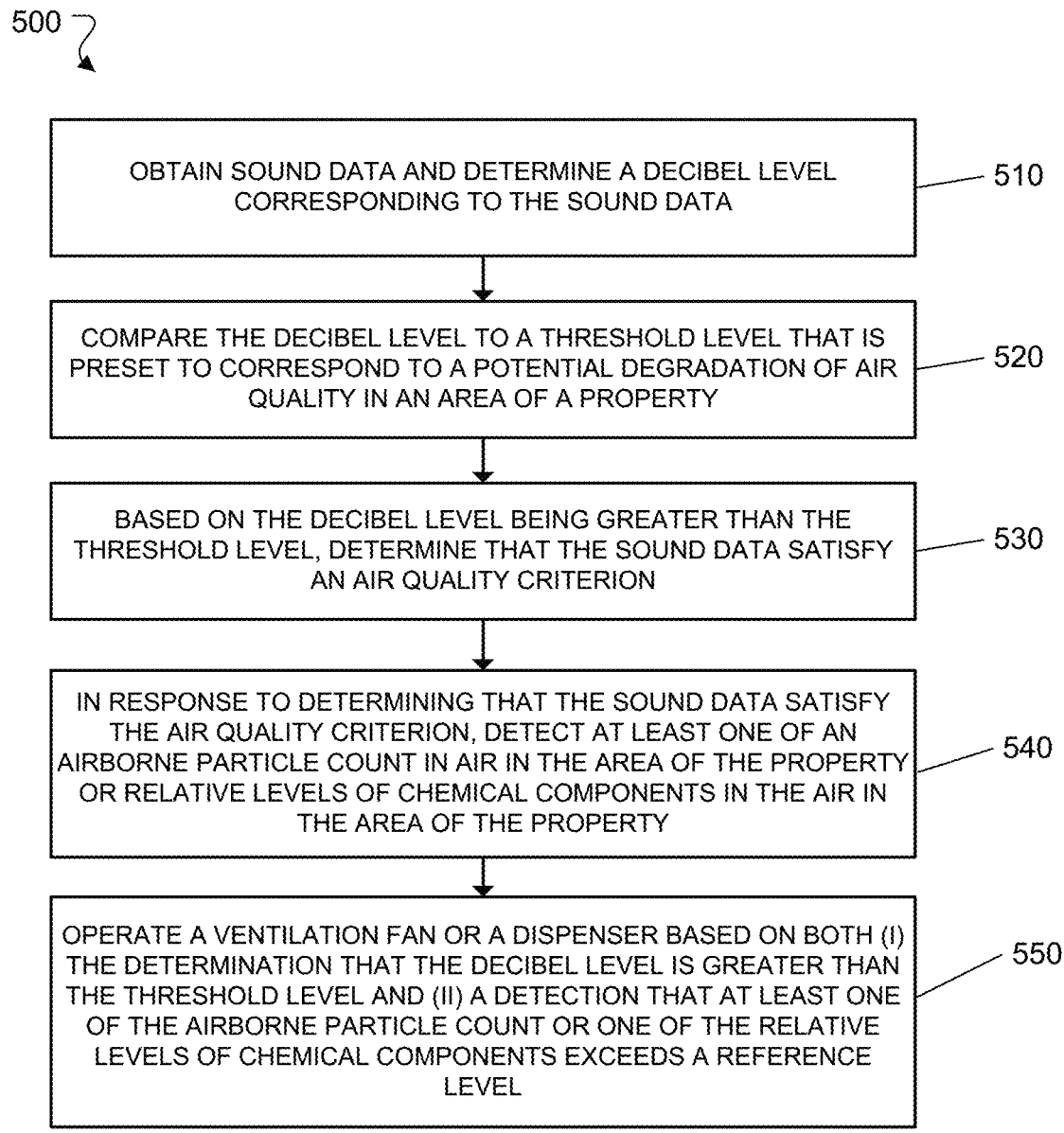
FIG. 5 is a flow diagram of an example process.

FIG. 5 is a flow diagram of an example process 500. The process 500 is described with examples performed with system 100 in FIG. 1. However, the process 500 may be performed with other systems and in other areas. For example, the system 100 may include additional sensors (e.g., a camera 204, a vibration sensor, a thermometer, a humidity sensor, etc.) in addition to the sound sensor 104 and the air quality sensor 106.

The process 500 may include obtaining sound data and determining a decibel level corresponding to the sound data (510), comparing the decibel level to a threshold level that is preset to correspond to a potential degradation of air quality in an area of a property (520), based on the decibel level being greater than the threshold level, determining that the sound data satisfy an air quality criterion (530), in response to determining that the sound data satisfy the air quality criterion, detecting at least one of an airborne particle count in air in the area of the property or relative levels of chemical components in the air in the area of the property (540), and based on both (i) the determination that the decibel level is greater than the threshold level and (ii) a detection that at least one of the airborne particle count or one of the relative levels of chemical components exceeds a reference level, operating a ventilation fan or a dispenser (550).

The process 510 may be similar to the process 410 described above. For instance, the control unit 110 may obtain sound data (e.g., a sound of a toilet flushing) from the sound sensor 104 (e.g., a microphone or a smart speaker). In some examples, the control unit 110 may include an analytic model configured to determine a decibel level corresponding to the obtained sound data. In other examples, the sound sensor 104 may determine a decibel level corresponding to the sound data, and transfer the determined decibel level to the control unit 110.

The process 520 may include comparing the decibel level to a threshold level that is preset to correspond to a potential degradation of air quality in an area of a property. In some implementations, the control unit 110 may include one or more preset threshold levels representing potential correspondence to degradation levels of air quality. For example, the control unit 110 may determine no potential degradation of air quality when the detected decibel level is less than 55 dB. The control unit 110 may determine a potential degradation of air quality when the detected decibel level is greater than equal to 55 dB. In this case, the threshold decibel level is 55 dB, which is determined based on 50% of an average decibel level of flushing sounds (e.g. 61 dB-6 dB). In some cases, the control unit 110 may determine potentially an intermediate air quality level when the detected decibel level is between 55 dB and 58 dB.

In some examples, the air quality may be scaled (e.g., between 0 and 1) with respect to a reference level. For example, the sound data may be scaled with respect to a reference decibel level (e.g., 61 dB) corresponding to an average of multiple toilet flushing sounds. For instance, when the obtained sound data is 60 dB, the control unit 110 determines that the air quality corresponds to 0.98 with respect to the reference decibel level, and compares the determined air quality (i.e., 0.98) with a reference air quality level (e.g., 0.5).

The process 530 may include, based on the decibel level being greater than the threshold level, determining that the sound data satisfy an air quality criterion. For instance, the control unit 110 may determine that the sound data satisfy the first air quality criterion based on the decibel level being greater than the threshold decibel level (e.g., 55 dB) or the scaled air quality level (e.g., 0.5). In this case, the sound data may correspond to a potential degradation of air quality.

The process 540 may include, in response to determining that the sound data satisfy the air quality criterion, detect at least one of an airborne particle count in air in the area of the property or relative levels of chemical components in the air in the area of the property. For example, in response to the control unit 110 determining that the sound data is below 55 dB, the control unit 110 may not detect air quality using an air quality sensor.

The air quality sensor 106 may detect the airborne particle count in the bathroom 102 or a relative level of methane in the bathroom 102. In some cases, the air quality sensor 106 may include an electric circuit that is configured to determine the airborne particle count and the relative chemical level and that is configured to transmit signals the airborne particle count and the relative chemical level to the control unit 110.

The process 550 may include, based on both (i) the determination that the decibel level is greater than the threshold level and (ii) a detection that at least one of the airborne particle count or one of the relative levels of chemical components exceeds a reference level, operate a ventilation fan or a dispenser. For instance, the air quality control device 108 may include a ventilation fan that is configured to circulate air in the area of the property or a dispenser that is configured to discharge an air freshening substance. The control unit 110 may operate one or both of the ventilation fan and the dispenser when the both of the (i) and (ii) conditions are satisfied. In this way, the control unit 110 may operate the ventilation fan and the dispenser when the air quality is actually degraded.

In some examples, the decibel level used in the process 500 may be a part of various input data for the air quality control analytics. In some examples, the process 500 may use only the decibel level to determine that the sound data satisfy an air quality criterion.

In some implementations, the air quality control system may analyze the sound itself similar to speech recognition to determine that the sound data satisfy an air quality criterion. For example, the air quality device 108 may be activated when a sound is detected and some analytic program/logic or artificial network determines that the detected sound corresponds to an engine running. In some examples, the air quality control system may be able to detect a sound from a modern engine that is typically quieter than an older engine, and trigger operation of the air quality device 108.

Similarly, in some examples, the air quality control system may analyze sounds and recognize a difference between sounds corresponding to different events. For example, the air quality control system may recognize that the sound of a flushing urinal is different than the sound of a flushing toilet. The control unit 110 may control the air quality control device 108 differently depending on the actual event that happened based on the analyzed sound. For instance, the control unit 110 may activate the air quality control device 108 for a first predetermined duration (e.g., 1 min) when the sound corresponds to a flushing urinal event. The control unit 110 may run the air quality control device 108 for a second predetermined duration (e.g., 5 minutes) when the sound corresponds to a flushing toilet event. In some examples, the control unit 110 may control other variables (e.g., rotating speed or frequency) of the air quality control device 108.

Figure 6:
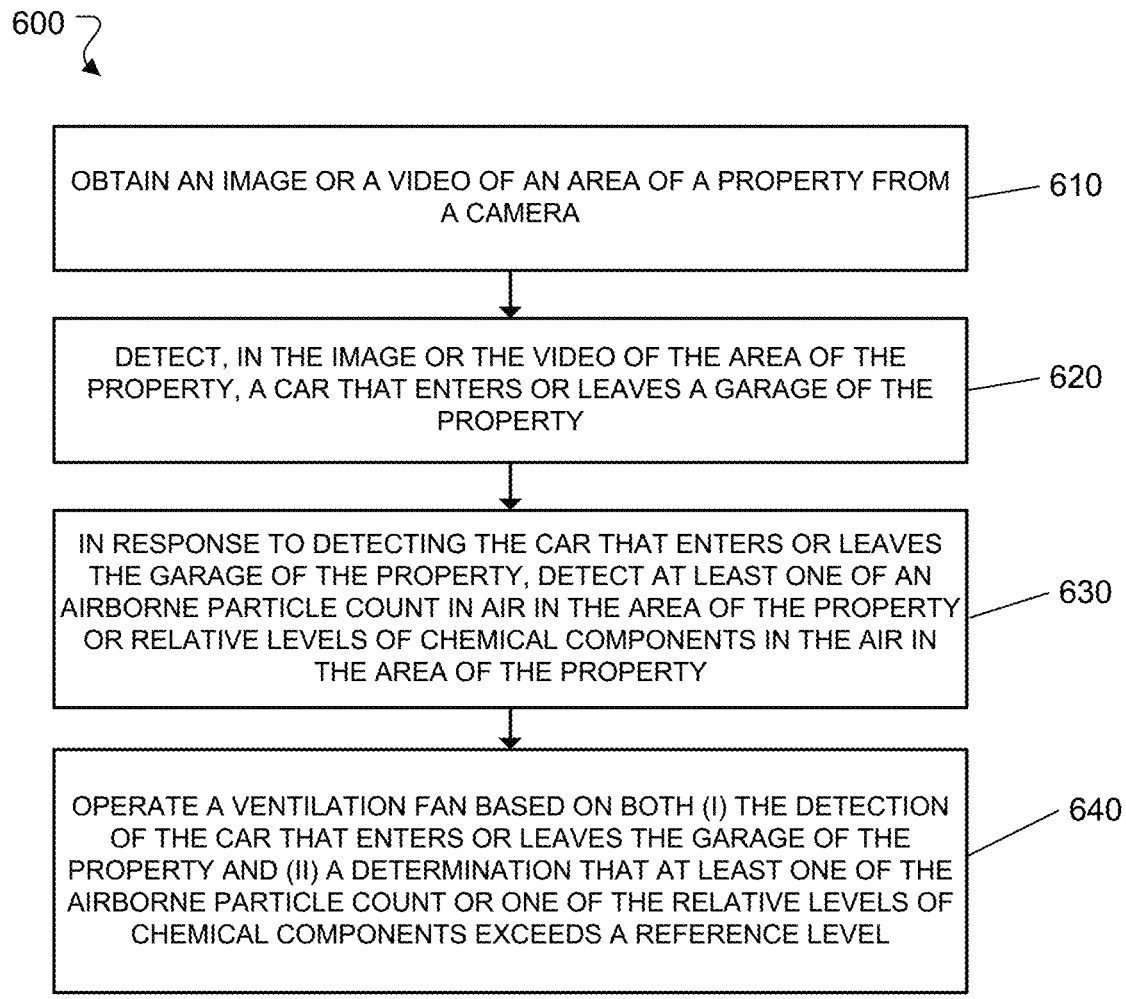
FIG. 6 is a flow diagram of an example process.

FIG. 6 is a flow diagram of an example process 600. The process 600 is described with examples performed with system 200 in FIG. 2. However, the process 600 may be performed with other systems and in other areas. For example, the system 200 may include additional sensors (e.g., a sound sensor 104, a vibration sensor, a thermometer, a humidity sensor, etc.) in addition to the camera 204 and the air quality sensor 206.

The process 600 may include obtaining an image or a video of an area of a property from a camera (610), detecting, in the image or the video of the area of the property, a car that enters or leaves a garage of the property (620), in response to detecting the car that enters or leaves the garage of the property, detecting at least one of an airborne particle count in air in the area of the property or relative levels of chemical components in the air in the area of the property (630), and based on both (i) the detection of the car that enters or leaves the garage of the property and (ii) a determination that at least one of the airborne particle count or one of the relative levels of chemical components exceeds a reference level, operating a ventilation fan (640).

The process 610 may include obtaining an image or a video of an area of a property from a camera. In some implementations, as shown in FIG. 2, a camera 204 may be installed at one or more areas of a property. For example, the camera 204 may be installed at a location (e.g., in the garage 202) to monitor the garage 202. The control unit 210 may receive an image or a video of a car 212 captured by the camera 204 thought a wireless communication. In some cases, the control unit 210 may receive the image or the video of the car 212 through one or more wires.

The process 620 may include detecting, in the image or the video of the area of the property, a car that enters or leaves a garage of a property. For example, the control unit 210 may, in the image or the video captured by the camera 204, detect that the car 212 enters or leaves the garage 202. In some implementations, the control unit 210 may include a video analytic model, an image recognition algorithm, or an artificial neural network configured to detect one or more objects in a monitored area. In some examples, the control unit 210 may compare images to prior or reference images to detect the one or more objects in the monitored area. In some implementations, the control unit 210 may process a sample image or video through the artificial neural network to detect and classify the one or more objects in the monitored area.

The process 630 may include, in response to detecting the car that enters or leaves the garage of the property, detecting at least one of an airborne particle count in air in the area of the property or relative levels of chemical components in the air in the area of the property. For example, the control unit 210 may, in response to detecting the car that enters or leaves the garage of the property, control the air quality sensor 206 to detect the airborne particle count in the garage 202 or relative levels of hydrocarbons, carbon dioxide, carbon monoxide, nitric oxygen in the garage 202. One or more of these and other gas components may be included in exhaust gas discharged from the car 212, and their relative levels may be elevated from reference levels as the car 212 enters or leaves the garage 202.

In some implementations, the process 630 may include: based on a detection of the car that enters or leaves the garage of the property, determining a potential degradation of air quality in the garage of the property, and in response to determining the potential degradation of air quality in the garage of the property, detecting at least one of an airborne particle count in air in the area of the property or relative levels of chemical components in the air in the area of the property.

The process 640 may include, based on both (i) the detection of the car that enters or leaves the garage of the property and (ii) a determination that at least one of the airborne particle count or one of the relative levels of chemical components exceeds a reference level, operating a ventilation fan. For instance, the air quality control device 208 may include a ventilation fan that is configured to circulate air in the garage 202 or an area adjacent to the garage 202. The control unit 210 may operate the ventilation fan when the both of the (i) and (ii) conditions are satisfied. In this way, the control unit 210 may operate the ventilation fan when the air quality is actually degraded.

Referring to FIG. 1, in some implementations, the control unit 110 may intermittently or continuously check the air quality data from the air quality sensor 106 while the air quality control device 108 is operated. In some examples, the air quality control device 108 may run until no motion is detected for a certain period of time, or until a humidity level in the bathroom 102 falls below a threshold humidity level. In other examples, the control unit 110 may turn off the air quality control device 108 based on multiple conditions. For instance, the air quality control device 108 may run until no motion is detected for 10 seconds and a methane level falls below a threshold level (e.g., 3%). In some cases, the air quality control device 108 may run for a set period of time (e.g., 5 minutes) regardless of the sensor data.

In some implementations, as shown in FIG. 2, the first sensor may correspond to the camera 204, and the second sensor may correspond to the air quality sensor 206. In some cases, the first sensor and the second sensor may correspond to multiple air quality sensors that are installed at different locations at a property. In these cases, the control unit 110 may determine activation of the air quality control device 108 based on sensor data from the multiple air quality sensors. For instance, the control unit 110 may turn on the air quality control device 108 based on a determination that the sensor data from some or all of the air quality sensors satisfy air quality criteria.

In some implementations, the air quality control systems 100, 200, and the system 300 may include one or more of the following features. For example, the air quality control system may include a camera, which can be an onboard camera of the air quality control device 108 or 208. Based on video analytics of the images and videos from the camera, the air quality control system may activate the air quality control device 108, 208, or 332 in certain situations. For instance, when a specific person is detected from the camera, the air quality control device may dispense a scent that has been set as pleasant smell for the specific person. In some cases, based on a detection of a pet entering a specific area of the property, the air quality control device may dispense a scent that discourages the pet from entering the specific area of the property.

In some implementations, the air quality control device may change types of scent or a dispensing frequency based on a number of people in an area or motion of the people to keep air fresh in the area. In some examples, the air quality control system may change the types of scent, the dispensing frequency, a dispensing volume based on other types of sensor data (e.g., temperature, humidity, motion, and time). For example, the air quality control system may dispense a sleep-inducing scent at night to help a user suffering from restless sleep.

In some implementations, the air quality control system may include a humidity sensor and a temperature sensor. In some examples, the air quality control system may include a humidifier and a dehumidifier that are configured to operate based on a humidity level measured by the humidity sensor and a temperature measured by the temperature sensor. Specifically, the air quality control system may activate the humidifier based on a determination that the humidity level falls below a first reference humidity level. The air quality control system may activate the dehumidifier based on a determination that the humidity level is elevated above a second reference humidity level. In some cases, the humidity sensor and the temperature sensor are connected to a HVAC system of the property. In such cases, the air quality control system may provide an instruction to the HVAC system to activate or deactivate a humidifier and a dehumidifier of the HVAC system.

In some implementations, the air quality control system includes various additional devices. For example, the air quality control device 108 may include a lightening device that may serve as a light fixture of the bathroom 102. In another example, the air quality control device 108 may include a motion sensor and a lightening device that may provide a guidance at night based on a detection of motion by the motion sensor. In some cases, the lightening device may provide mood lighting during a party in the property. In some implementations, the air quality control system may interact with other devices such as outdoor temperature sensors, water sensors, weather sensors, alarm systems, or video cameras. For instance, the air quality control device may be activated based on rain detected by the weather sensor.

In some implementations, the air quality control system may include an onboard speaker/microphone that can play music based on a user input (e.g., a voice command) and that enables a two-way communication (e.g., phone calls) between users that are located at different locations. For example, the air quality control system may receive, from a first user, a voice command such as predetermined keywords or phrases, and send a notification to a second user (e.g., an emergency contact, a care-provider).

In some implementations, the air quality control system may monitor various factors that affect air quality (e.g., air toxicity, air contamination, and air humidity) in public areas such as public restrooms, schools, and theaters. The air quality control system allows one or more users to access air quality data of the public areas. For example, the air quality control system may transmit the air quality data of the public areas to mobile devices of the users, and the mobile devices display public restrooms near the users in order of the air quality data. Similarly, the air quality control system may monitor air quality data of multiple areas (e.g., bathrooms) of a home. For instance, a user may ask a smart hub connected to the air quality control system of the home by speaking "Smart Home, which bathroom currently has the best air quality?" The smart hub may output a sound response "upstairs bathroom" via an onboard speaker of the smart hub based on the air quality data received from the air quality control system.

In some cases, the air quality control system may control air quality without actually sampling air or measuring air quality through an air quality sensor. Referring to FIGS. 1 and 2, the air quality control systems 100 may not include the air quality sensor 106, and the air quality control system 200 may not include the air quality sensor 206. In some examples, the control unit 210 may be configured to, based on the camera 204 detecting the car 212, instruct the air quality control device 208 to circulate air for 10 minutes without checking air quality data from the air quality sensor 206. In some examples, where the air quality control system includes other types of sensors such as a vibration sensor, the control unit 210 may be configured to circulate air as long as the vibration sensor detects vibration of a running engine.

In some implementations, the air quality control system may control air quality based on vibration data and air quality data. For example, referring to FIG. 2, the air quality control system 200 may include a vibration sensor instead of the camera 204. In some cases, the air quality control system 200 may include a vibration senor in addition to the camera 204. The control unit 210 may be configured to, based on the vibration sensor detecting vibration corresponding to a car entering a garage or a person/animal walking by, determine whether to obtain air quality data from the air quality sensor 206 and whether to activate the air quality control device 208 based on a pre-set rule. For instance, the control unit 210 may not obtain air quality data from the air quality sensor 206 or may not operate a ventilation fan based on the vibration sensor detecting vibration corresponding to a person/animal walking by.

In some examples, the control unit 210 may operate the ventilation fan based on both (i) the vibration sensor detecting vibration corresponding to the car that enters or leaves the garage and (ii) a determination that at least one of the airborne particle count or one of the relative levels of chemical components exceeds a reference level. In some examples, the control unit 210 may not operate the ventilation fan based on a determination that at least one of the airborne particle count or one of the relative levels of chemical components is less than or equal to the reference level although the vibration sensor detected vibration corresponding to the car that enters or leaves the garage.

In some implementations, the air quality control system may operate an air quality device using a single sensor. For example, one air quality sensor 106 may be sufficient to control the air quality control device 108 without other sensors such as a sound senor or a camber. In some examples, the air quality sensor 106 may sample the air at a predetermined interval (e.g., every 1/5/10/30 seconds, minutes, or hours, etc.), and the control unit 110 may activate and deactivate the air quality control device 108 based on the air quality data alone.

In some implementations, the air quality control system may operate an air quality device using three or more sensors. For instance, the air quality control system 100 may include three or more sensors among a sound sensor 104, an air quality sensor 106, a camera 204 (see FIG. 2), a vibration sensor, a humidity sensor, a thermometer, and a proximity sensor. In some examples, the control unit 110 may collect sensor data from all or some of the three or more sensors and determine whether the collected sensor data satisfy a given criteria before activating the air quality control device 108. In some examples, the control unit 110 may obtain first sensor data from one sensor among the three or more sensors, and determine whether to obtain second sensor data from another sensor among the three or more sensors.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining first sensor data from a sensor that is not an air quality sensor;
determining that the first sensor data satisfy a first air quality criterion;
in response to determining that the first sensor data satisfy the first air quality criterion, obtaining second sensor data from an air quality sensor;
determining that the second sensor data satisfy a second air quality criterion; and
based on a determination that the second sensor data satisfy the second air quality criterion, activating an air quality device,
wherein obtaining the first sensor data comprises obtaining sound data from a sound sensor that is configured to detect a sound in an area of a property.

2. The method of claim 1, further comprising:
obtaining third sensor data from the air quality sensor after the second sensor data are obtained;
determining that the third sensor data does not satisfy the second air quality criterion; and
based on a determination that the third sensor data do not satisfy the second air quality criterion, turning off the air quality device.

3. The method of claim 1, wherein the sound data represent at least one of a flushing sound from a toilet, a urinating sound from the toilet, a sound from a door of the property, a sound from a car in the property, or a sound from a garage of the property, and
wherein the second sensor data comprise air quality data comprising at least one of an airborne particle count in air in the area of the property or relative levels of chemical components in the air in the area of the property.

4. The method of claim 3, wherein determining that the first sensor data satisfy the first air quality criterion comprises:
determining the sound data matches the flushing sound or the urinating sound.

5. The method of claim 1, wherein determining that the first sensor data satisfy the first air quality criterion comprises:
determining a decibel level corresponding to the sound data;
comparing the decibel level to a threshold level that is preset to correspond to a potential degradation of air quality in the area of the property; and
based on the decibel level being greater than the threshold level, determining that the sound satisfy the first air quality criterion.

6. The method of claim 5, wherein obtaining second sensor data from the air quality sensor comprises:
in response to determining that the decibel level is greater than the threshold level, detecting at least one of an airborne particle count in air in the area of the property or relative levels of chemical components in the air in the area of the property.

7. The method of claim 6, wherein activating the air quality device comprises:
based on both (i) the determination that the decibel level is greater than the threshold level and (ii) a detection that at least one of the airborne particle count or one of the relative levels of chemical components exceeds a reference level, operating a ventilation fan that is configured to circulate air in the area of the property or a dispenser that is configured to discharge an air freshening substance.

8. The method of claim 1, wherein obtaining the first sensor data comprises:
obtaining an image or a video of an area of a property from a camera that is configured to monitor the area of the property,
wherein determining that the first sensor data satisfy the first air quality criterion comprises detecting, in the image or the video of the area of the property, a car that enters or leaves a garage of the property, and
wherein obtaining the second sensor data from the air quality sensor comprises, in response to a detection of the car that enters or leaves the garage of the property, detecting at least one of an airborne particle count in air in the area of the property or relative levels of chemical components in the air in the area of the property.

9. The method of claim 8, wherein activating the air quality device comprises:
based on both (i) the detection of the car that enters or leaves the garage of the property and (ii) a determination that at least one of the airborne particle count or one of the relative levels of chemical components exceeds a reference level, operating a ventilation fan that is configured to circulate air in the area of the property.

10. An integrated air quality control system, comprising:
an air quality sensor that is configured to monitor air quality in an area of a property;
a sensor that is not an air quality sensor;
an air quality device that is configured to be operated based on data from the sensor and the air quality sensor; and
at least one controller configured to perform operations comprising:
obtaining first sensor data from the sensor that is not the air quality sensor,
determining that the first sensor data satisfy a first air quality criterion,
in response to determining that the first sensor data satisfy the first air quality criterion, obtaining second sensor data from the air quality sensor,
determining that the second sensor data satisfy a second air quality criterion, and
based on a determination that the second sensor data satisfy the second air quality criterion, activating the air quality device,
wherein the sensor comprises a sound sensor that is configured to detect a sound in the area of the property, and
wherein obtaining the first sensor data comprises obtaining sound data from the sound sensor.

11. The system of claim 10, wherein the operations comprise:
obtaining third sensor data from the air quality sensor after the second sensor data are obtained;
determining that the third sensor data does not satisfy the second air quality criterion; and
based on a determination that the third sensor data do not satisfy the second air quality criterion, turning off the air quality device.

12. The system of claim 10, wherein determining that the first sensor data satisfy the first air quality criterion comprises:
determining an intensity level corresponding to the sound data; and comparing the intensity level to a threshold level that is preset to correspond to a potential degradation of air quality in the area of the property, and wherein obtaining the second sensor data from the air quality sensor comprises:

in response to determining that the intensity level of the sound sensor is greater than the threshold level, detecting at least one of an airborne particle count in air in the area of the property or relative levels of chemical components in the air in the area of the property.

13. The system of claim 12, wherein activating the air quality device comprises:

based on both (i) the determination that the intensity level is greater than the threshold level and (ii) a detection that at least one of the airborne particle count or one of the relative levels of chemical components exceeds a reference level, operating a ventilation fan that is configured to circulate air in the area of the property or a dispenser that is configured to discharge an air freshening substance.

14. The system of claim 10, wherein the sensor comprises a camera that is configured to monitor the area of the property, wherein obtaining the first sensor data comprises obtaining an image or a video of the area of the property from the camera, wherein determining that the first sensor data satisfy the first air quality criterion comprises detecting, in the image or the video of the area of the property, a car that enters or leaves a garage of the property, and wherein obtaining the second sensor data from the air quality sensor comprises, in response to a detection of the car that enters or leaves the garage of the property, detecting at least one of an airborne particle count in air in the area of the property or relative levels of chemical components in the air in the area of the property.

15. The system of claim 14, wherein the air quality device comprises a ventilation fan that is configured to circulate air in the area of the property, and wherein activating the air quality device comprises:

operating the ventilation fan based on both (i) the detection of the car that enters or leaves the garage of the property and (ii) a determination that at least one of the airborne particle count or one of the relative levels of chemical components exceeds a reference level.

16. At least one non-transitory computer-readable storage medium having stored thereon instructions which, when executed by at least one processor, cause performance of operations comprising:

obtaining first sensor data from a sensor that is not an air quality sensor;

determining that the first sensor data satisfy a first air quality criterion;

in response to determining that the first sensor data satisfy the first air quality criterion, obtaining second sensor data from an air quality sensor;

determining that the second sensor data satisfy a second air quality criterion; and based on a determination that the second sensor data satisfy the second air quality criterion, activating an air quality device, wherein obtaining the first sensor data comprises obtaining sound data from a sound sensor that is configured to detect a sound in an area of a property, wherein determining that the first sensor data satisfy the first air quality criterion comprises:

determining an intensity level corresponding to the sound data; and comparing the intensity level to a threshold level that is preset to correspond to a potential degradation of air quality in the area of the property, and wherein obtaining the second sensor data from the air quality sensor comprises:

in response to determining that the intensity level of the sound sensor is greater than the threshold level, detecting at least one of an airborne particle count in air in the area of the property or relative levels of chemical components in the air in the area of the property.

17. The storage medium of claim 16, wherein activating the air quality device comprises:

based on both (i) the determination that the intensity level is greater than the threshold level and (ii) a detection that at least one of the airborne particle count or one of the relative levels of chemical components exceeds a reference level, operating a ventilation fan that is configured to circulate air in the area of the property or a dispenser that is configured to discharge an air freshening substance.

18. A computer-implemented method comprising:

obtaining first sensor data from a sensor that is not an air quality sensor;

determining that the first sensor data satisfy a first air quality criterion;

in response to determining that the first sensor data satisfy the first air quality criterion, obtaining second sensor data from an air quality sensor;

determining that the second sensor data satisfy a second air quality criterion; and based on a determination that the second sensor data satisfy the second air quality criterion, activating an air quality device, wherein obtaining the first sensor data comprises obtaining an image or a video of an area of a property from a camera that is configured to monitor the area of the property, wherein determining that the first sensor data satisfy the first air quality criterion comprises detecting, in the image or the video of the area of the property, a car that enters or leaves a garage of the property, and wherein obtaining the second sensor data from the air quality sensor comprises, in response to a detection of the car that enters or leaves the garage of the property, detecting at least one of an airborne particle count in air in the area of the property or relative levels of chemical components in the air in the area of the property.

19. The method of claim 18, wherein activating the air quality device comprises:

based on both (i) the detection of the car that enters or leaves the garage of the property and (ii) a determination that at least one of the airborne particle count or one of the relative levels of chemical components exceeds a reference level, operating a ventilation fan that is configured to circulate air in the area of the property.

* * * * *